US009277371B2

(12) United States Patent  
Kotecha et al.

(10) Patent No.: US 9,277,371 B2  
(45) Date of Patent: Mar. 1, 2016

(54) GROUPED MULTICAST/BROADCAST SINGLE FREQUENCY NETWORK (MBSFN) SPLITTING

(71) Applicants: Verizon Patent and Licensing Inc., Basking Ridge, NJ (US); Cellco Partnership, Basking Ridge, NJ (US)

(72) Inventors: Lalit R. Kotecha, San Ramon, CA (US); Arda Aksu, Martinez, CA (US); Yee Sin Chan, San Jose, CA (US); Steven R. Rados, Danville, CA (US); David Chiang, Fremont, CA (US); Thomas W. Haynes, San Ramon, CA (US); Jyothi Keshavdas, Pleasanton, CA (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 311 days.

(21) Appl. No.: 13/955,755

(22) Filed: Jul. 31, 2013

(65) Prior Publication Data

US 2015/0036494 A1 Feb. 5, 2015

(51) Int. Cl.
*H04W 28/02* (2009.01)
*H04W 4/06* (2009.01)
*H04L 29/06* (2006.01)

(52) U.S. Cl.
CPC ................. *H04W 4/06* (2013.01); *H04L 65/00* (2013.01); *H04L 65/4076* (2013.01)

(58) Field of Classification Search
CPC ..... H04L 65/00; H04L 67/306; H04L 65/608; H04L 43/08; H04W 4/06
See application file for complete search history.

(56) References Cited

U.S. PATENT DOCUMENTS

| | | | |
|---|---|---|---|
| 2011/0112909 A1* | 5/2011 | Singh et al. | 705/14.66 |
| 2013/0078925 A1 | 3/2013 | Aguirre et al. | |
| 2013/0104173 A1 | 4/2013 | Tjio et al. | |
| 2014/0067950 A1* | 3/2014 | Winograd | 709/204 |

* cited by examiner

*Primary Examiner* — Kim T Nguyen

(57) ABSTRACT

A reporting server receives reports on content items being accessed by a plurality of UE devices through a first multicast/broadcast single frequency network (MBSFN). The reporting server determines, for each content item being accessed, which of the UE devices is accessing the content item. The UE devices are then grouped by the accessed content items such that at least one content item is accessed by a first group of UE devices and not accessed by a second group of UE devices. The reporting server then sends data representing the first and second groups to a broadcast video provisioning system (BVPS) with a recommendation to split the MBSFN into second and third MBSFNs. In another implementation, the reporting server receives reports from fourth and fifth MBSFNs and recommends joining the fourth and fifth MBSFNs to form a sixth MBSFN if broadcast bandwidth requirements are met.

20 Claims, 10 Drawing Sheets

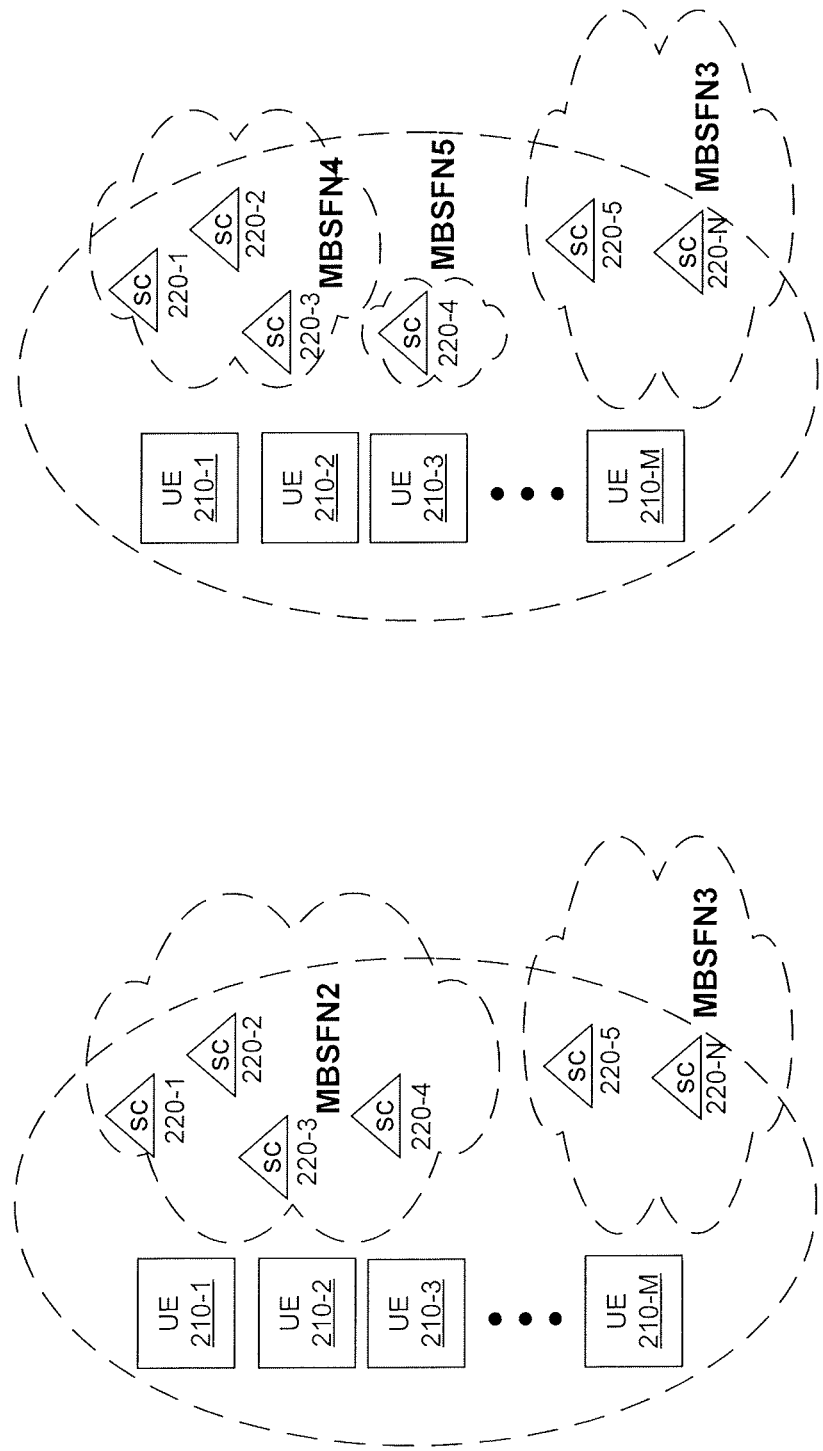

GROUPED MULTICAST/BROADCAST SINGLE FREQUENCY NETWORK (MBSFN) SPLITTING

BACKGROUND

Electronic programming may include multimedia content that is either unicast, multicast or broadcast to mobile devices in a particular geographic area, using one or more channels in a wireless network. A service venue may be, for example, a stadium, an arena, a golf course, a race track, an amusement park, a shopping mall or any other type of geographical area where multiple user equipment (UE) devices may want to access on-line content items concurrently. For example, in a sporting venue, many viewers may want to watch television coverage of the game being played to be able to see additional content, such as another camera angle or the game broadcast of a rival team, that is not available to those actually attending the event. This content may be broadcast or multicast to the viewers who want to watch it in a single channel, allowing the remaining bandwidth to be used for telephone calls or for unicast transmissions to individual attendees.

BRIEF DESCRIPTION OF THE DRAWINGS

FIGS. 2, 2A and 2B are functional block diagrams of example environments in which systems and/or methods, described herein, may be implemented;

DETAILED DESCRIPTION OF PREFERRED EMBODIMENTS

The following detailed description refers to the accompanying drawings. The same labels and/or reference numbers in different drawings may identify the same or similar elements.

In one or more implementations, devices may be used to control the delivery of multimedia content, including audio, video and data to user equipment (UE) devices in a wireless network.

Figure 1:
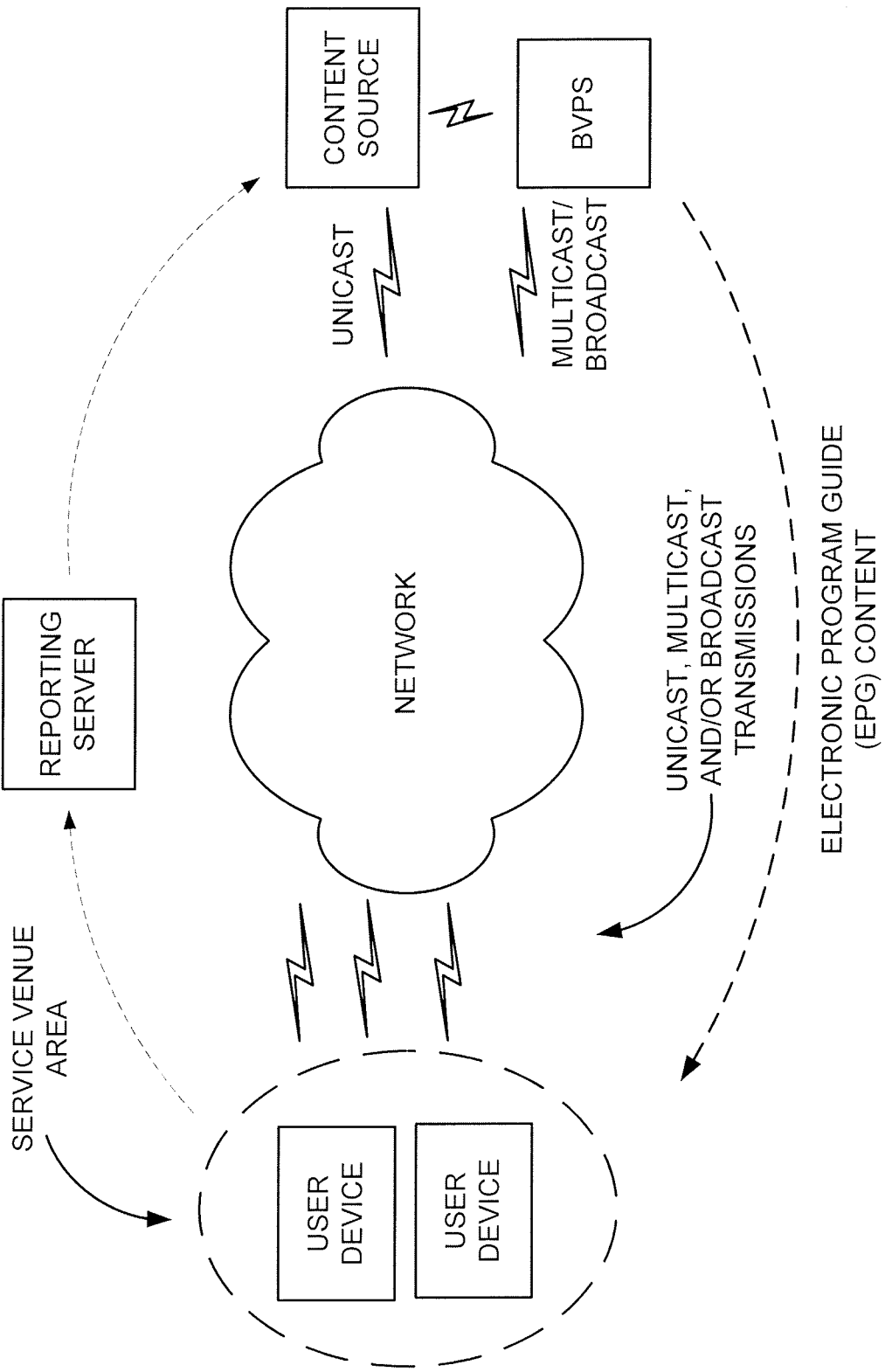
FIG. 1 is a block diagram of an example overview of an implementation described herein.

FIG. 1 is a diagram of an example providing an overview of an implementation described herein. A content source may provide multimedia content to be sent to the UE devices by broadcast, multicast or unicast. A unicast content stream is sent to a single UE device. A broadcast stream is sent so that it may be received by any of the UE devices. A multicast stream is sent to selected UE devices while other UE devices are excluded from receiving the stream. In the materials that follow, references to "broadcast," "broadcast transmission" or "broadcast services" also include multicast. The unicast content is provided through the packet data network gateway and the service gateway of the network.

The examples described below provide wireless communication services in multiple small cell base stations (not shown in FIG. 1) located inside the service venue area. As described below, these small cell base stations are used to implement one or more multicast/broadcast single frequency networks (MBSFNs). The small cell base stations, which may be micro cells, pico cells and/or femto cells, are low-power base stations, in our examples, evolved node B (eNB) devices. Each small-cell eNB device is configured to broadcast or unicast content items to UE devices that are within a short range around the base station, i.e. within a small cell. A micro cell typically has a range of less than 2 km, a pico cell, less than 200 m and a femto cell less than 10 m. The small cells are arranged in the service venue such that each UE device in the service venue can connect to (e.g. camp on) one of the small cell base stations. The network can hand off the UE device from one small cell base station to another.

In some implementations, the broadcast multimedia content is provided via a broadcast video provisioning system (BVPS) server. A reporting server may monitor the number of UE devices that are receiving or would like to receive each content item and the location of each UE device. The BVPS server may monitor network conditions corresponding to the network (e.g., network congestion, network resources, dates and times, the number of UE devices within the service venue area, etc.) It may also determine, based on the network conditions and data provided by the reporting server, whether to provide a particular content item to one or more of the UE devices as a broadcast transmission or to allow the content to be provided by unicast.

In some implementations, UE devices outside of the service venue area (not shown) may receive multimedia content via unicast transmission services and UE devices inside the service venue area may receive the content item via broadcast transmission services. Whether a particular UE device receives content via unicast or broadcast transmission services depends on the available bandwidth of the small cell base stations that are located within range of the UE device and the number of devices coupled to the small cell base stations that are requesting content. In such implementations, a reporting server may keep track of the location of each UE device and the number of UE devices in the service area that are accessing or want to access each content item. In certain implementations, a UE device inside of the service venue area may receive multimedia content via unicast transmission services if sufficient unicast bandwidth is available and if the number of UE devices requesting or accessing the content item via a particular group of small cell base stations is less than a minimum threshold value.

Accordingly, the BVPS server, operating in concert with a broadcast multicast service control (BMSC) node (not shown in FIG. 1) and a multicast/broadcast multimedia service gateway (MBMS-GW) (not shown in FIG. 1), may optimize multimedia content delivery by using different types of transmission services, depending on network conditions and demand. For example, in an implementation where a first portion of the radio frequency bandwidth of a group of small cell base stations, arranged as an MBSFN, is reserved for unicast transmission services and a second portion is reserved for broadcast transmission services, the BVPS server may adjust the percentage of bandwidth to be used to broadcast content. If a number of UE devices have requested content that is currently being unicast and the number is greater than a threshold, the BVPS server may cause the content to be transmitted by the MBSFN to the UE devices using broadcast transmission services. Accordingly, the capability of the BVPS server to work with varying network conditions, multiple radio frequency bands, multiple transmission services and multiple MBSFNs may enable the BVPS server to optimize the delivery of content to the UE devices. The operation and structure of an example BVPS that may be adapted for use in the example implementations is described in copending U.S. patent application Ser. No. 13/280,816 entitled "BROADCAST VIDEO PROVISIONING SYSTEM" filed Oct. 25, 2011, the contents of which are incorporated herein by reference.

The terms "multimedia content," "content," "content item" and "content element" as used herein, are interchangeable and may include any variety or combination of audio, video and data programming. Examples include: camera feeds, audio commentary, web content, text, music, concerts, radio programs, television programs, videos, shows, movies and/or one or more other types of media-based programming.

Figure 2:
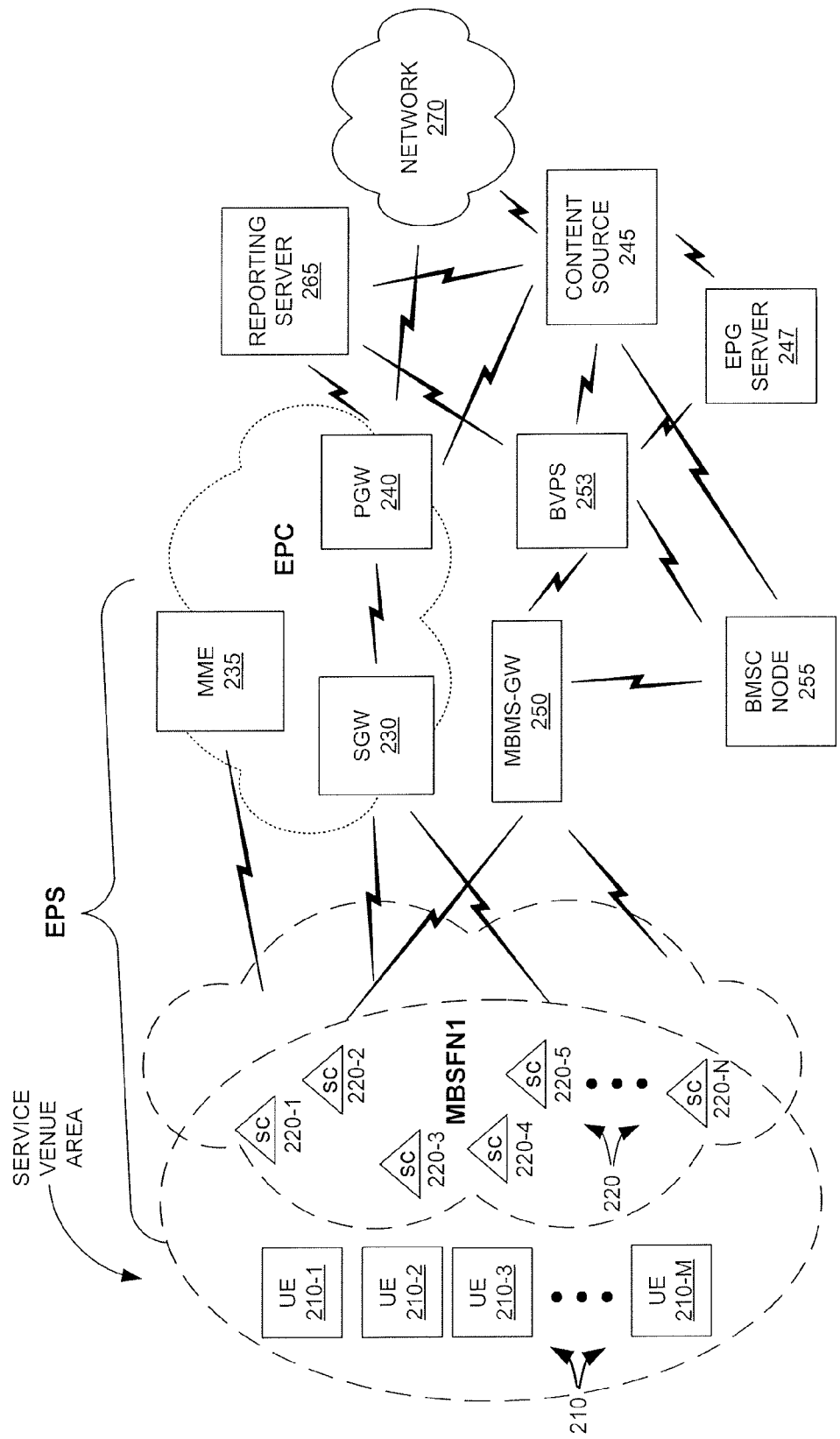

FIG. 2 is a diagram of an example environment 200 in which systems and/or methods described herein may be implemented. As shown in FIG. 2, environment 200 may include multiple UE devices 210-1, 210-2, 210-3, . . . , 210-M (where M≥1) (referred to collectively herein as UE devices 210 and individually as UE device 210). In the example, the UE devices 210 obtain content over-the-air via a number of small cell base stations. Hence, the environment 200 also includes a group of small cell base stations 220-1, . . . , 220-N (where N≥1) (referred to collectively herein as "small cell base stations 220" and individually as "small cell base station 220"). The environment 200 further includes a serving gateway 230 (hereinafter referred to as "SGW 230"), a mobility management entity device 235 (hereinafter referred to as "MME 235"), a packet data network (PDN) gateway (PGW) 240, electronic program guide (EPG) server 247, MBMS-GW 250, BMSC node 255, a reporting server 265, a BVPS 253, a content source 245, and a network 270. The number of devices and/or networks, illustrated in FIG. 2, is provided for explanatory purposes only. In practice, there may be additional devices and/or networks, fewer devices and/or networks, different devices and/or networks, or differently arranged devices and/or networks than illustrated in FIG. 2.

In the implementation shown in FIG. 2, the small cell base stations 220 are arranged as a single MBSFN, labeled MBSFN1. In this configuration, each of the small cell base stations 220, under control of the MBMS-GW 250 and the BMSC node 255, receives and broadcasts the same content, as provided by the content source 245 to the BVPS 253. Unicast content is provided from the content source 245 to the small cell base stations using the SGW 230 and PGW 240. Telephone calls are handled through standard telecommunications channels (not shown). For a given small cell base station 220, any bandwidth that is not used for the telecommunications channels is available to provide unicast or broadcast transmissions.

Also, in some implementations, one or more of the devices of environment 200 may perform one or more functions described as being performed by another one or more of the devices of environment 200. Devices of environment 200 may interconnect via wired connections, optical connections, wireless connections, or a combination of wired, optical and wireless connections.

Implementations are described as being performed within a radio access network (RAN) that is based on a long term evolution (LTE) network for explanatory purposes. In other implementations, the implementations may be performed within a RAN that is not based on a LTE network.

Environment 200 may include an evolved packet system (EPS) that includes a LTE network and/or an evolved packet core (EPC) that operate based on a third generation partnership project (3GPP) wireless communication standard. The LTE network may be a RAN that includes one or more small cell base stations 220 that take the form of eNBs in one or more MBSFNs via which UE devices 210 communicate with the EPC. The EPC may include SGW 230, MME 235, and/or PGW 240 that enable UE devices 210 to communicate with network 270, using unicast transmissions, and/or an Internet protocol (IP) multimedia subsystem (IMS) core (not shown).

As described in more detail below, in one implementation, the MBSFN is dynamically split to increase the total content that may be delivered to UE devices in the environment 200. As shown in FIG. 2, all of the small cell base stations 220-1-220-N are arranged in a single MBSFN. If the UE devices 210 serviced by small cell base stations 220-5 through 220-N want to access at least some content items that are not accessed by the UE devices serviced by small cell base stations 220-1-220-4, the BMSC node 255 and MBMS-GW may split MBSFN1 into two MBSFNs, MBSFN2 and MBSFN3, as shown in FIG. 2A. The splitting operation may be applied recursively to each of these sub-networks. Thus, if the UE devices being serviced by small cell base station 220-4 access different content than the UE devices serviced by small cell base stations 220-1-220-3, the network MBSFN2 may be split into two networks, MBSFN4 and MBSFN5, as shown in FIG. 2B. Further splits are also possible. As content flow changes and/or other demands for transport through the environment 200 change (e.g. more or less regular phones calls), the MBSFNs can be recombined, e.g. from the three different MBSFNs of FIG. 2B, into two as in FIG. 2A or back to just one as in FIG. 2.

With reference again to FIG. 2, UE device 210 may include any computation or communication device, such as a wireless mobile communication device that is capable of communicating with small cell base station 220 and/or a network, e.g., network 270. Examples of the UE device 210 include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. UE device 210 may send traffic to and/or receive traffic from network 270. The UE devices are programmed with applications (Apps) that access content from the network. An example UE device 210 may have multiple Apps running at a given time and, thus, may access multiple unicast, multicast and broadcast streams.

Small cell base station 220 may include one or more devices that receive, process, and/or transmit traffic, such as audio, video, text, and/or other data, destined for and/or received from a UE device 210. In an example implementation, small cell base station 220 may be an eNB associated with the LTE network that receives traffic from and/or sends traffic to network 270, reporting server 265 and BVPS 253. Communication with the reporting server 265 and the EPG server 247 is unicast via the SGW 230 and PGW 240. Communication with the BVPS 253 is via the MBMS-GW 250 as controlled by the BMSC node 255. Small cell base station 220 may send traffic to and/or receive traffic from UE device 210 via an air interface. In another example, one or more other small cell base stations 220 may be associated with a RAN that is not associated with the LTE network. An example small cell base station 220 is described below with reference to FIG. 4.

SGW 230 may include one or more computation or communication devices that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 230 may aggregate traffic received from one or more small cell base stations 220 associated with the LTE network, and may send the aggregated traffic to network 270 (e.g., via PGW 240) and/or other network devices associated with the EPC. SGW 230 may also receive traffic from the other network devices and/or may send the received traffic to UE device 210 via small cell base station 220. SGW 230 may perform operations associated with handing off UE device 210 from and/or to the LTE network.

MME 235 may include one or more computation or communication devices that gather, process, search, store, and/or provide information in a manner described herein. For example, MME 235 may perform operations associated with handing off UE device 210, from a first small cell base station 220 to a second small cell base station 220, when UE device 210 is exiting a cell associated with the first small cell base station 220 or when the first small cell base station may better serve the UE device 210 than the second small cell base station. MME 235 may, in yet another example, perform an operation to handoff a UE device 210 from the second small cell base station 220 to the first small cell base station 220 when the UE device 210 is entering the cell associated with first small cell 220 base station.

PGW 240 may include one or more computation or communication devices that gather, process, search, store, and/or provide information in a manner described herein. PGW 240 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 240 may include a device that aggregates traffic received from one or more SGWs 230, etc. and may send the aggregated traffic to network 270. In another example implementation, PGW 240 may receive traffic from network 270 and may send the traffic toward one of the UE devices 210 via SGW 230.

The EPG server 247 provides program guide information about available multimedia content items to UE devices 210, for presentation to users of the devices 210, for example, to allow users to select content items of interest. In an example, each MBSFN in the service venue has a different EPG, although respective EPGs may be provided for the various MBSFNs from the same or different servers 247. The EPG server 247 may include one or more of a variety of computing devices. For example, EPG server 247 may include a server, a cluster of servers, or one or more other types of computing or communication devices. EPG server 247 may store, or otherwise have access to, data corresponding to one or more versions of one or more EPGs indicating content that is currently available for viewing by the UE devices 210. EPG server 247 may receive data indicating the current multicast and broadcast content available via content source 245 and BVPS 253 and the current unicast content available via content source 245 and PGW 240 and SGW 230 for each of the MBSFNs. EPG content may include any variety or combination of information relating to available media-based programs. For instance, EPG content may include program titles, program descriptions, program statistics (e.g., the number of times a video or program has been accessed), program ratings, program reviews, program broadcast dates, program broadcast times, program broadcast channels, images, videos, and/or other types of information relating to programs communicated to UE device 210. The EPG data may be provided to BVPS as one or more content items that may be broadcast to the UE devices 210, in a manner similar to broadcast of other multimedia content items through the environment 200. This content may be updated periodically, for example, every five minutes, or when the reporting server 265 determines that the content items listed in the various EPGs should be changed.

The BVPS 253 and the BMSC node 255 may periodically cause the EPG associated with a particular MBSFN to be broadcast to all of the UE devices 210 being serviced by the small cell base stations 220 in the MBSFN. The EPGs may be broadcast at fixed intervals. Alternatively, the BVPS may monitor multicast and broadcast traffic so that the EPG data for a particular MBSFN is sent at irregular intervals when there is sufficient broadcast bandwidth. In addition or alternatively, any UE device 210 may send a unicast request to the EPG server 247 for a current copy of its EPG. In response, the EPG server causes the appropriate EPG data to be sent in a unicast response to the requesting UE device via the PGW 240 and SGW 230. The example EPG indicates all multimedia content that is currently being accessed, whether by unicast, multicast or broadcast in the particular MBSFN. In addition, the EPG may indicate content that is not currently being accessed but that is available for access in the MBSFN.

Reporting server 265 may include one or more of a variety of computing devices. For example, reporting server 265 may include a server, a cluster of servers, or one or more other types of computing or communication devices. Reporting server 265 may receive and store, or otherwise have access to, reports and/or survey results provided by the UE devices 210 indicating the locations of the UE devices and the programming that they are accessing or would like to access. The reporting server 265 receives reports from the UE devices identifying the content items being accessed because the system may not maintain a record of which UE devices 210 are receiving what broadcast content items. In addition, in its response, a UE device may request content that is not currently being broadcast. The reporting server 265 obtains this information directly from the UE devices 210 to ensure timely and accurate information on the content items that are currently in demand. In an example, the reporting server 265, using information in the reports and/or survey results, is configured to process item access statistics to determine, for each multimedia content item, the number of UE devices 210 that are accessing the multimedia content item, the small cell base station(s) 220 through which the content is being accessed and whether the content item is being accessed by unicast or is being broadcast to UE devices 210. Reporting server 265 may also, or alternatively, monitor network conditions corresponding to UE devices 210 and/or, one or more devices of the LTE network or the EPC network. As mentioned above, examples of network conditions may include available bandwidth through one or more of the small cell base stations 220 serving the venue area, a level of network activity, a level of network congestion, a period of time corresponding to peak network usage hours, a period of time corresponding to off-peak network usage hours, a location of UE device 210 relative to the service venue area, etc. In one implementation, the functions of the EPG server 247 may be performed by the reporting server 265.

MBMS-GW 250 may include one or more computation or communication devices that gather, process, search, store, and/or provide information in a manner described herein. MBMS-GW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. For example, MBMS-GW 250 may provide connectivity between one or more small cell base stations 220 and other network devices (e.g., BMSC node 255) for broadcasting and/or multicasting programming content, EPG content, or other types of data to UE devices 210. For instance, in some implementations, MBMS-GW 250 may include a device that aggregates traffic received from one or more BMSC nodes 255 and may send the aggregated traffic to one or more small cell base stations 220 for broadcasting and/or multicasting.

BMSC node 255 may include one or more computation or communication devices that gather, process, search, store, and/or provide information in a manner described herein. BMSC node 255 may receive content from BVPS 253 and format the content for broadcasting and/or multicasting the content to UE devices 210 via MBMS-GW 250 and the MBSFNs each including one or more small cell base stations 220. In another example, BMSC node 255 may retrieve programming content and/or other types of content from network 270 (e.g., a content delivery network (CDN)), format the programming content for broadcasting and/or multicasting, and provide the content to the MBSFNs for delivery to UE devices 210. Additionally, or alternatively, BMSC node 255 may provide other services, such as digital rights management (DRM) services, relating to content, provided to UE devices 210. The BMSC node 255 and MBMS-GW 250 are configured to control multiple MBSFNs. Alternatively the system shown in FIG. 2 may include multiple BMSC nodes 255 and MBMS-GWs 250 to control the multiple MBSFNs.

BVPS 253 may include one or more computation and/or communication devices, that gather, process, and/or provide information in a manner described herein. For example, BVPS 253 may include a server device, a workstation computer, a network device, etc. In an example implementation, BVPS 253 may receive information associated with the event taking place in the service venue area and may assign an event identifier to the event based on the event information. BVPS 253 may provide the event identifier to BMSC node 255 located at the event location, and may determine an amount of cell capacity of the small cell base stations 220 in each of the one or more MBSFNs serving the event location. A content source 245 may capture, for broadcast or unicast, the live event data and provide the data that is to be broadcast to the BVPS 253 while providing the data that is to be unicast to the PGW 240. Content source 245 also receives content from network 270. It may also have pre-stored content, for example non-event related content, such as movies, for delivery to the UE devices 210. Based on the event information, BMSC 255 may cause the live event data from the BVPS 253 to be broadcast to the UE devices 210 serviced by one or more of MBSFNs, at the event location, when UE devices 210 request the live event data. BVPS 253 may include a centralized system that is responsible for communicating EMBMS session information with one or more BMSC nodes 255. BVPS 253 may utilize appropriate interfaces and parameters to seamlessly create broadcast sessions in each MBSFN with minimal impact to network traffic and while optimizing customers' quality of experience.

In one implementation, BVPS 253 also instructs the small cell base stations 220 in each of the one or more MBSFNs to reserve bandwidth at the event location by issuing commands (e.g., a START event command), which may result in a set of control signaling of the event through BMSC node 255, MBMS-GW 250, MME 235, and small cell base station 220. The control signaling may trigger small cell base stations 220 in the MBSFN to create dedicated bearers (e.g., guaranteed bit rate bearers) with a quality of service class indicator (QCI). This process may be repeated for each item of multimedia content to be delivered through the one or more MBSFNs.

Additionally, or alternatively, BVPS 253 may analyze network conditions and determine how content should be transmitted to UE devices 210. For example, BVPS 253 may decide whether the content should be transmitted to UE device 210 via a multicast transmission service or a broadcast transmission service. In some implementations, the transmission services may be allocated to one or more radio frequency bands.

In some implementations, one radio frequency band may be dedicated to broadcast content, while another radio frequency band is dedicated to unicast content. In such examples, the BVPS 253 analyzes many factors, including the current network conditions, the current levels of unicast and broadcast content, the number of users accessing each item of content, to determine percentage of the band that can be used for broadcast transmissions that allow the largest number of users in the service venue area to access their desired content. The total frequency band may be either 10 MHz or 20 MHz and as much as 60 percent of the frequency band may be used for broadcast transmissions.

Network 270 may include one or more wired and/or wireless networks. For example, network 270 may include a cellular network, a public land mobile network (PLMN), a second generation (2G) network, a third generation (3G) network, a fourth generation (4G) network, a fifth generation (5G) network, and/or another network. Additionally, or alternatively, network 270 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks. The network 270 may be accessed by the UE devices via the PGW 240. It is also accessed by the content source 245 to obtain web content to be broadcast to the UE devices 210.

While implementations described herein are described primarily in the context of broadband services to/from the UE devices via LTE, other wireless standards may be used. For example, components conforming to LTE standards described herein may be replaced by components conforming to other network standards (e.g., GSM, WCDMA, UMB, UMTS, CDMA2000, HSPA, 802.11, or other network standards).

Figure 3:
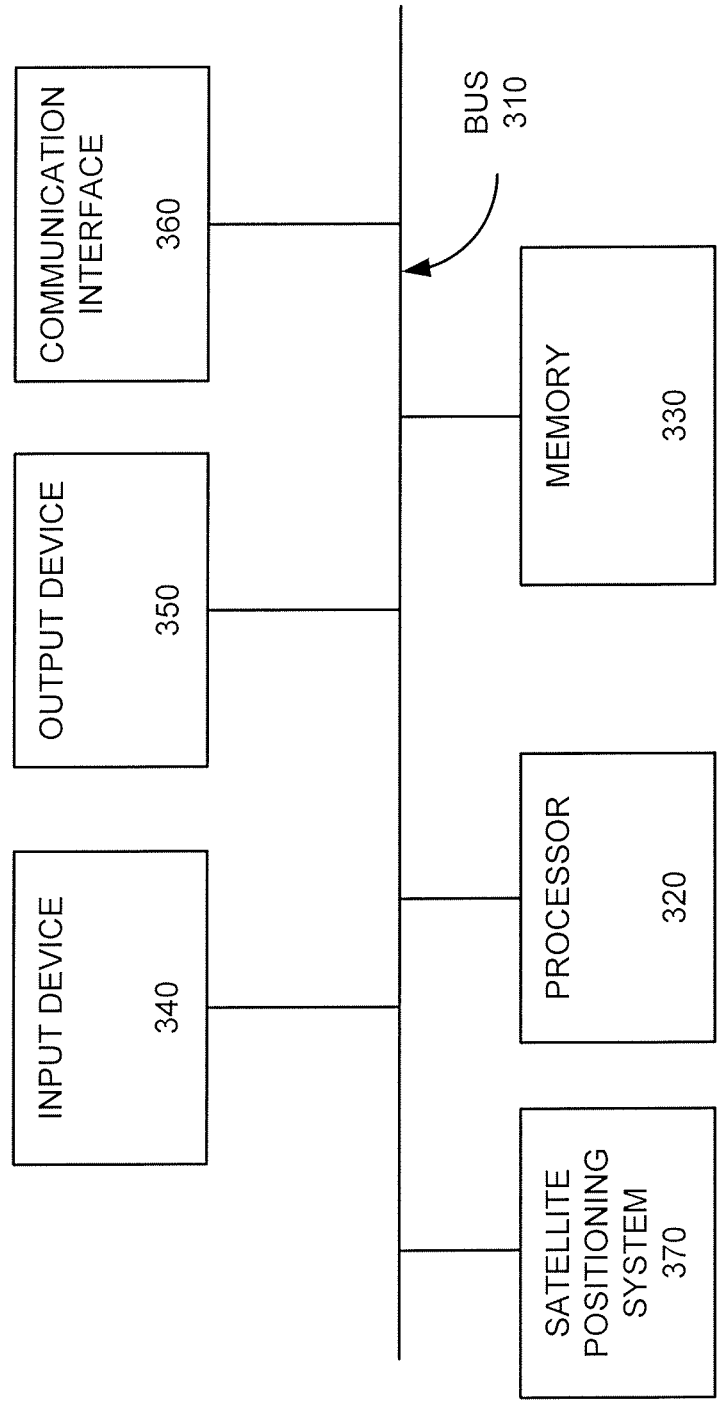
FIG. 3 is a block diagram of example components of a device that may be utilized in the environment of FIG. 2.

FIG. 3 is a diagram of example components of a device 300 according to one or more implementations described herein. In certain implementations, device 300 may correspond to one or more of the devices depicted in FIG. 2. For example, device 300 may correspond to UE device 210, SGW 230, MME 235, PGW 240, content source 245, EPG server 247, MBMS-GW 250, BMSC node 255 or reporting server 265. Additionally, each of UE device 210, SGW 230, PGW 240, video source 245, EPG server 247, MME 235, MBMS-GW 250, BMSC node 255 or reporting server 265 may include one or more devices 300 or one or more components of device 300.

As depicted, device 300 may include bus 310, processor 320, memory 330, input device 340, output device 350 and communication interface 360. Also, if the device 300 is a UE device 210, it may include a satellite positioning system (SPS) receiver 370. However, in other implementations, device 300 may include fewer components, additional components, different components, or differently arranged components than those illustrated in FIG. 3.

Bus 310 may include one or more component subsystems and/or communication paths that enable communication among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system, and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type optical, wireless or wired interface. Communication interface 330 may also include an antenna (or a set of antennas) that permit wireless communication, such as the transmission and reception of radio frequency (RF) signals in accordance with the applicable standard for wireless communications with the small cell base station 220.

The optional SPS receiver 370 is used in some implementations to provide location information to the reporting server 265. Alternatively, the processor 320 generates the location information, for example, as the identity of the small cell base station 220 servicing the UE device or as respective signal strength measurements obtained from all of the small cell base stations 220 from which the UE device 210 is able to sense. These signal strength measurements may be used by the reporting server 265 to calculate the location of the UE device, either by fingerprinting or by trilateration. The position of the UE device 210 is used to determine which small cell base station(s) 220 can service the UE device.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
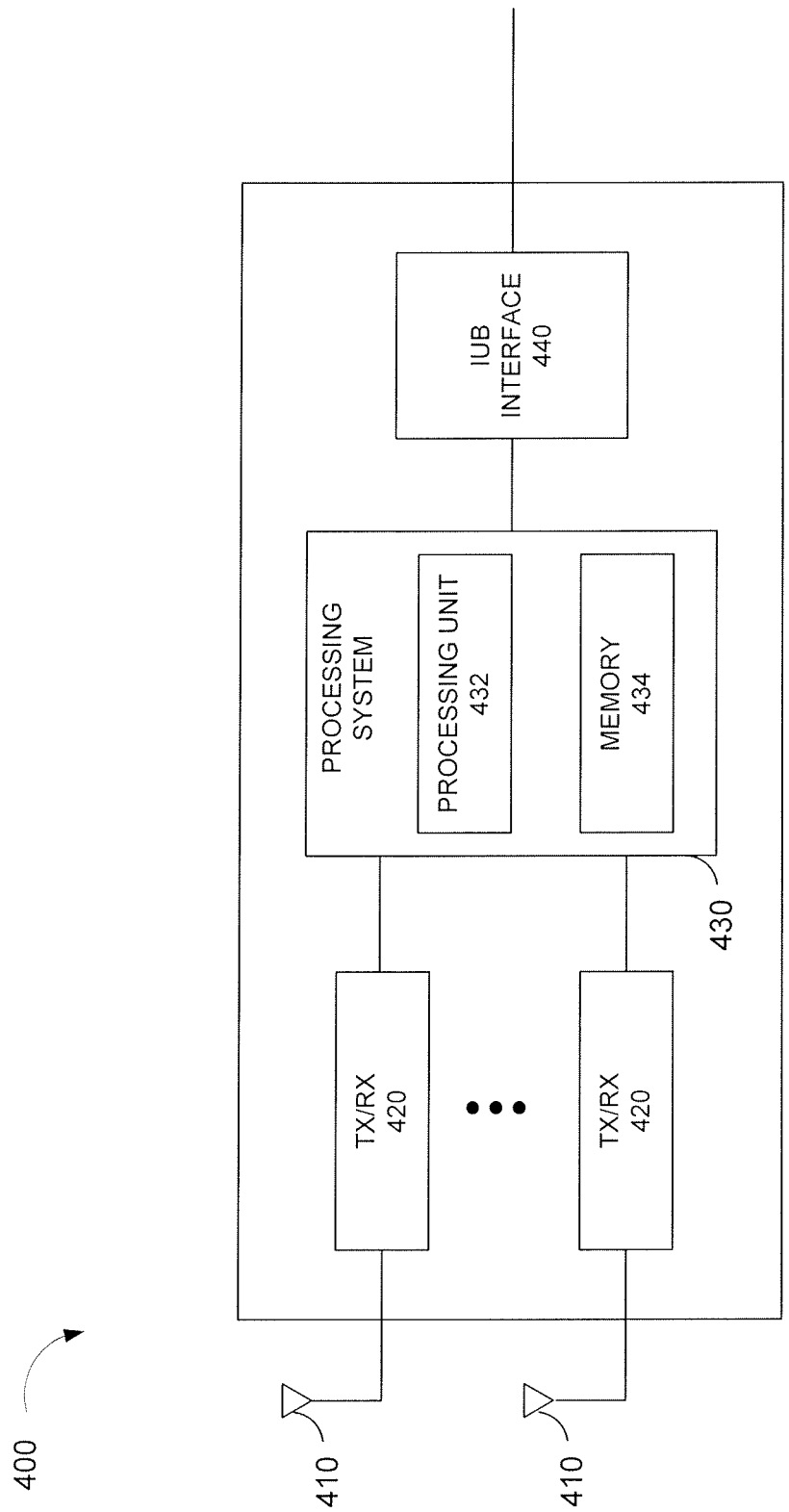
FIG. 4 is a block diagram of a small cell base station according to one or more implementations described herein.

FIG. 4 is a diagram of functional components of device 400 that may correspond to one or more of the small cell base stations 220 according to one or more of the implementations described herein. Alternatively, or additionally, device 400 may include one or more devices 400 and/or one or more portions of devices 400.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more tasks described as being performed by one or more other components of device 400.

As shown in FIG. 4, device 400 may include antennas 410, transceivers (TX/RX) 420, a processing system 430, and an Iub interface (I/F) 440. Antennas 410 may include one or more directional and/or omni-directional antennas. Transceivers 420 may be associated with antennas 410 and may include transceiver circuitry for transmitting and/or receiving symbol sequences in an MBSFN, via antennas 410.

Processing system 430 may control the operation of device 400. The example processing system 430 also processes information received via transceivers 420 and Iub interface 440. Processing system 430 further measures quality and strength of a connection, determines a frame error rate (FER), and provides this information to one or more other devices in environment 200. As illustrated, processing system 430 includes a processing unit 432 and a memory 434.

Processing unit 432 includes one or more processors, microprocessors, application specific integrated circuits (ASICs), field programmable gate arrays (FPGAs), or the like. Processing unit 432 processes information received via transceivers 420 and Iub interface 440. The processing includes, for example, data conversion, forward error correction (FEC), rate adaptation, Wideband Code Division Multiple Access (WCDMA) spreading/dispreading, quadrature phase shift keying (QPSK) modulation, etc. In addition, processing unit 432 may transmit control messages and/or data messages, and causes those control messages and/or data messages to be transmitted via transceivers 420 and/or Iub interface 440. Processing unit 432 also processes control messages and/or data messages received from transceivers 420 and/or Iub interface 440.

Memory 434 includes a random access memory (RAM), a read-only memory (ROM), and/or another type of memory to store data and instructions that may be used by processing unit 432.

Iub interface 440 includes one or more line cards that allow device 400 to transmit data to and receive data from, for example, MBMS-GW 250.

As described herein, example device 400 performs certain operations in response to processing unit 432 executing software instructions contained in a computer-readable medium, such as memory 434. The software instructions are read into memory 434 from another computer-readable medium or from another device via antennas 410 and transceivers 420. The software instructions contained in memory 434 cause processing unit 432 to perform processes described herein. Alternatively, hardwired circuitry may be used in place of or in combination with software instructions to implement processes described herein. Thus, implementations described herein are not limited to any specific combination of hardware circuitry and software.

Figure 5:
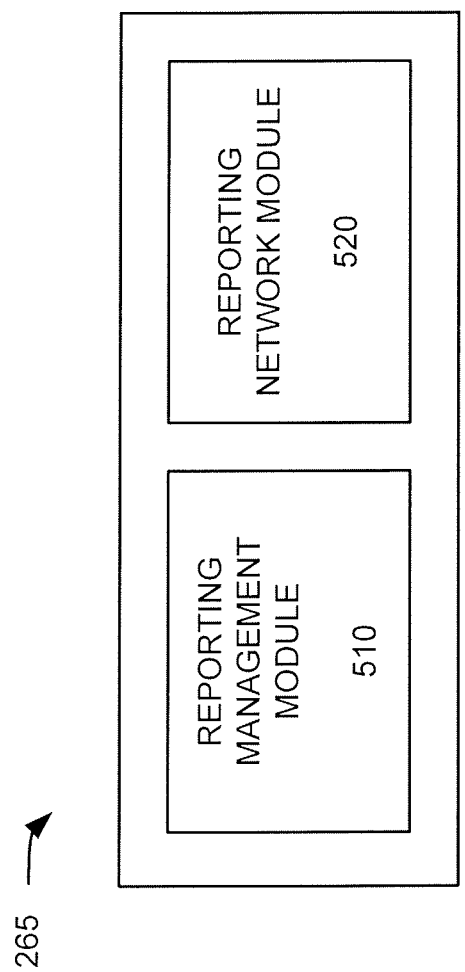
FIG. 5 is a block diagram of example showing functional components of a reporting server according to one or more implementations described herein.

FIG. 5 is a diagram of example functional components of reporting server 265 according to one or more implementations described herein. As illustrated, the example of a reporting server 265 includes a reporting management module 510 and a reporting network module 520. Depending on the implementation, one or more of the modules 510-520 may be implemented as a combination of hardware and software based on the components illustrated and described with respect to FIG. 3. Alternatively, modules 510-520 may each be implemented as hardware based on the components illustrated and described with respect to FIG. 3.

Reporting management module 510 may provide functionality with respect to managing reports and/or survey responses received from the UE devices 210. For example, the reporting management module 510 enables reporting server 245 to query each of the UE devices as to its location, what content it is currently accessing, how the content is being accessed (e.g. unicast or broadcast) and what additional content the user would like to access. The reporting management module also enables reporting server 245 to send surveys to the UE devices 510 and to receive reports and/or survey responses from the UE devices 210. The surveys sent to the UE devices 210 may ask the users to rate different content currently listed in their EPGs. As described below, this information may be used to determine which content is to be unicast or broadcast by which MBSFN and to determine any additional content that should be listed in the EPGs as being available to be unicast or broadcast. In addition, the reports and surveys for a particular MBSFN may be used to determine whether the MBSFN should be split and the aggregate reports for multiple MBSFNs may be used to determine whether the multiple MBSFNs should be joined into a single MBSFN.

Reporting network module 520 may provide functionality with respect to communicating the results of the reports from the UE devices 210. For example, reporting network module 520 may enable reporting server 265 to transmit a query to a particular UE device 210 and then to receive the response to that query. The reporting network module 520 may also monitor current network conditions. In some implementations, the network conditions may include a level of network congestion corresponding to an access network of the network or another portion of the network. As mentioned above, additional examples of network conditions may include a period of time corresponding to the network (e.g., a period of time corresponding to peak network usage hours, a period of time corresponding to off-peak network usage hours, etc.), a location of a UE device 210 relative to a service venue area, for example, which small cell base stations 220 can provide programming content to the UE device, or another type of condition relating to the network and/or UE device 210.

Reporting network module 520 may also, or alternatively, enable reporting server 265 to determine whether to recommend providing an item of content via a particular MBSFN as a unicast or broadcast transmission. In some implementations, this determination is based on one or more factors, such as a number of UE devices 210 currently accessing a multimedia content item, a number that want to access the content item, a level of requested or specified quality of the content item, or a level of network congestion corresponding to the network or another type of network condition corresponding to the network.

Reporting network module 520 also, or alternatively, enables reporting server 265 to optimize the delivery of content by, for example, causing the content source 245 to use unicast services in a single MBSFN including all of the small cell base stations 220 to deliver all multimedia content to UE devices when network congestion is low, and, when network congestion is high, cause the BVPS 253 to use broadcast services to deliver all multimedia content to UE devices 210 through multiple MBSFNs.

In addition to the functionality described above, functional components of reporting server 265 may also, or alternatively, provide functionality as described elsewhere in this specification. While FIG. 5 shows a particular number and arrangement of modules, in alternative implementations, reporting server 245 may include additional modules, fewer modules, different modules, or differently arranged modules than those depicted.

Figure 6:
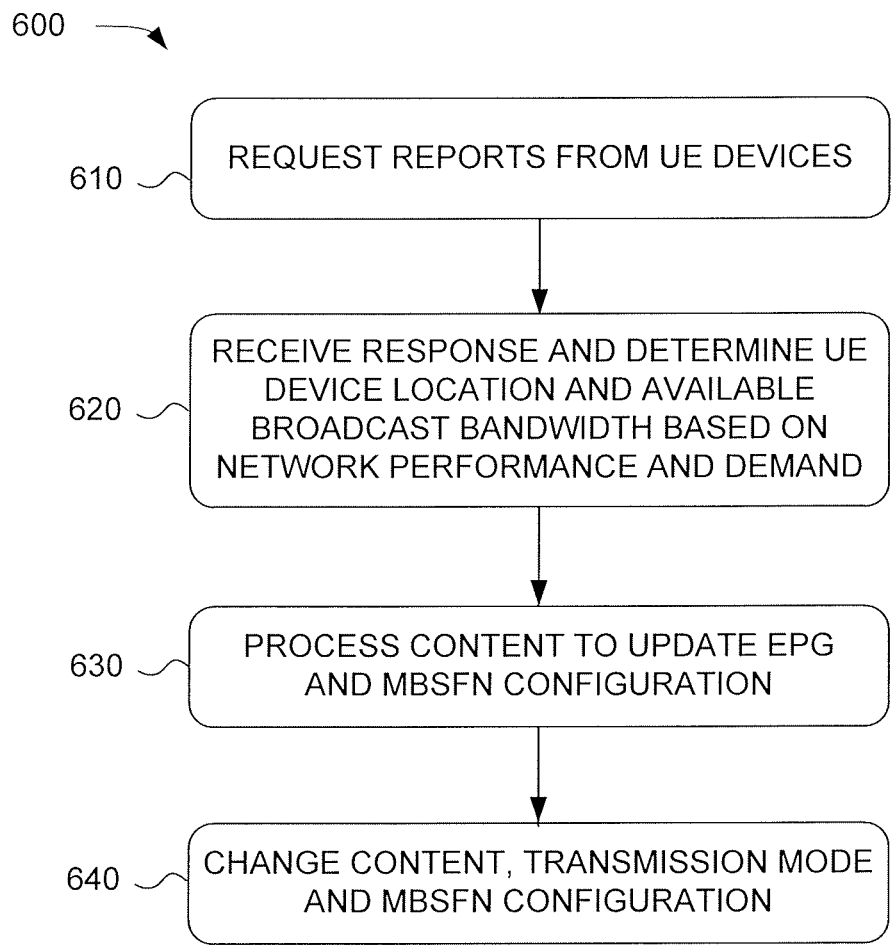
FIG. 6 is a flow-chart diagram of an example process executed by the reporting server to control evolved multicast broadcast multimedia service (EMBMS) and MBSFN transmissions according to one or more implementations described herein.

FIG. 6 is a flow chart of an example process 600 that runs on reporting server 265 according to one or more implementations described herein. In one or more implementations, process 600 may be performed by one or more components of reporting server 265. In other implementations, one or more blocks of process 600 may be performed by one or more other components/devices, or a group of components/devices, including or excluding reporting server 265.

In this example, the reporting server 265 requests reports of location and accesses content from one or more of the UE devices 210 (block 610). The server 265 may request reports only for the UE devices 210 that are served by a particular MBSFN or from all of the UE devices served by all of the MBSFNs. For example, reporting server 265 may send unicast requests to all of the UE devices 210-1 through 210-M. It may then receive unicast responses from each of the UE devices. Alternatively, the reporting server 265 may broadcast a request for reports to all of the UE devices 210 being serviced by a particular MBSFN (e.g. as in FIG. 2) or in a particular group of MBSFN (e.g. those shown in FIG. 2A or as shown in FIG. 2B). A group of MBSFNs may be selected based on the number of UE devices 210 being served by small cell base stations 220 in the MBSFN. The number of UE devices 210 may be selected such that a manageable number of reports are received in response to a broadcast request. The broadcast request may be a separate event or it may be combined with the delivery of the EPG data for the MBSFN such that, when the UE device 210 receives the EPG data it responds with a report. When the requests are broadcast, each UE device sends its report as a unicast response with a random delay to avoid collisions with replies from other UE devices. A value for the delay may be generated by applying a hash function to the reply data. In this example, each reply is sent as a unicast message from the UE device 210 to the small cell base station 220 and ultimately to the reporting server 265. To conserve bandwidth, the reports may be compressed before they are sent to the small cell base stations 220, for example by sending the location of the UE device only when it has changed from the previous report and by sending information identifying the accessed content or request to access content as a sequence of bits, each corresponding to a respective EPG entry where a "1" indicates that a UE device is accessing or wants to access the multimedia content item and a "0" indicates no access.

The request sent by the reporting server 265 to the UE devices 210 may or may not be displayed to the user. If it is not displayed, the UE device that receives the request automatically responds with an indication of the content it is currently accessing as well as content in the EPG that it would like to access. If the request is displayed to the user, it may include a survey form asking for ratings on the content that the user is accessing. In the example, the survey response is optional. In the example implementations, the content items accessed by the UE devices are through an application program running on the UE device. A user may opt out of providing any information to the reporting server. If, however, the user opts out of providing her location or content selections to the reporting server, she will have no input on the content selections that are provided through the MBSFN servicing her UE device 210.

In one implementation, a survey may be used to initially determine the location of each of the UE devices in the one or more MBSFNs and what content is currently broadcast to the UE devices 210. The EPG sent to the UE devices 210 in each MBSFN may list several multimedia content items that are available and the survey asks the users to vote for one or more of the items. Depending on the available bandwidth, the BVPS may select the one or more items receiving the highest number of votes and broadcast these selections to all of the UE devices 210 in the MBSFN. Alternatively, if the selected content requires a payment, the BVPS may multicast the content selection only to the UE devices in the MBSFN that voted to receive it.

If the service venue is a stadium where a sporting event, for example a football game, is being played, the EPG may include game-related items such as the video feed and commentary that is being provided for terrestrial or cable television broadcast or individual raw feeds from the cameras covering the game. The content may be audio, video, text or web content. For example, users may want to listen to the commercially broadcast commentary while watching the game live. The EPG may also include broadcast feeds from other games, for example, games being played by rival teams. Alternatively, content related to the rival team may be via a lower-bandwidth service such as audio, text, HTML or XML. The EPG may also include content that is not game-related, such as videos or movies, for example, to keep children entertained. The ratio of non-game-related content to game-related content may be changed dynamically during the game, such that more non-game-related content is offered during halftime, for example. In addition, more non-game-related content may be offered if the EPG requests indicate an increase in demand for non-game-related content. The timing of when to provide the content may be a part of the event description or may be determined dynamically based on user demand.

In one implementation, the reporting server 265 may ask UE device 210 for permission to access their social network contacts. If permission is granted, the module 520 may query the UE devices of any contacts in the service venue and make content items being accessed by those contacts available to the UE device 210.

In such an environment, fans of the home and visiting teams may be located in different areas of the stadium. As such, the small cell base stations 220 in the different areas may be assigned to different MBSFNs such that the visiting fans may have access to different content than the fans of the home team. The UE devices 210 may be assigned to the different MBSFNs based on their location and/or content preferences.

The reporting server 265 receives the reports and/or survey responses and, in one implementation, may determine how much broadcast bandwidth is available on the small cell base stations 220 associated with each MBSFN. The available bandwidth is determined based on the performance of the MBSFN and the demand for telecommunication services (block 620). Thus, the available bandwidth is a function of both the amount of content being accessed (both unicast and broadcast) and the quality of service (QoS) that is available for any unused bandwidth in the MBSFN. In this implementation, the reporting server 265 receives information on the available bandwidth of the MBSFN from the BMSC node 255. In an example implementation, an MBSFN may have an available bandwidth of 10 MHz for broadcast and unicast transmissions. This bandwidth may be divided so that 5 MHz is reserved for unicast transmissions and 5 MHz is reserved for broadcast transmissions. In this implementation, the bandwidth available transmitting unicast and broadcast multimedia content is the bandwidth of the small cell base stations assigned to the MBSFN minus any bandwidth consumed by wireless phone calls.

Next, the reporting server 265 processes the reports and surveys that it received (block 630), as described below with reference to FIG. 7. Finally, the reporting server 265 provides the processed reports and surveys to the BVPS 253 and to the content source 245 to possibly change the MBSFN configuration and/or to change the mix of content being sent by unicast and broadcast, based on the received responses. Data from the responses may also be provided to the EPG server 247 to change the number and content of EPG offerings based on the number of MBSFNs and the content being accessed by the UE devices 210 being serviced by each MBSFN. Alternatively, the BVPS and content source may instruct the EPG server 247 to change the number of EPGs and the offered programs in each EPG based on the data provided by the reporting server 265. The reporting server 265 sends the recommendations and the ranked lists to the BVPS at block 640.

Figure 7:
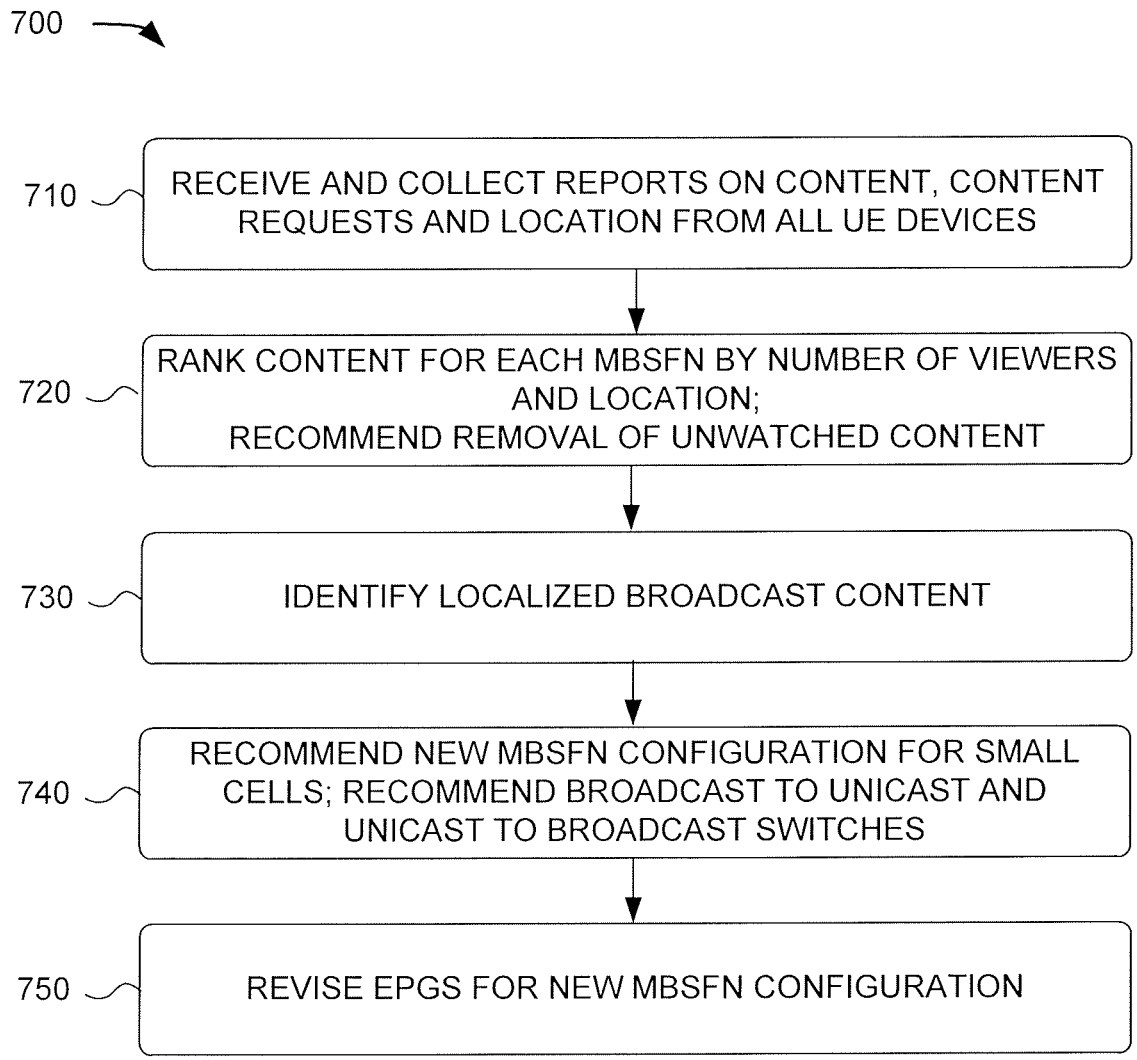
FIG. 7 is a flow-chart diagram of details of an example process executed by the reporting server.

FIG. 7 is a flow-chart diagram of a process 700 performed by the reporting server 265 in processing the reports received from the UE devices 210 of the MBSFNs as briefly described above with reference to block 630. In one implementation, the reports are processed into lists, one list for each MBSFN. Each list contains the programs that users of the UE devices 210 in the MBSFN are accessing or would like to access.

In an example implementation, the reporting server generates recommendations to change the mix of broadcast and unicast content, to split one MBSFN to form two MBSFNs and/or to join two MBSFNs to form one MBSFN. The recommendations may be based on the number of content items in the EPGs of the various MBSFNs and the positions of multimedia content items in the ranked lists, one list for each MBSFN. For example, if the reporting server 265 determines that the number of UE devices 210 that are accessing a broadcast content item is less than three, it recommends that the content item be switched from broadcast to unicast. Conversely, if more than three UE devices request a unicast content item, the reporting server 265 recommends switching the item from unicast to broadcast. An MBSFN may be split if the reporting server 265 determines that first and second sets of UE devices 210 are accessing different content items through small cell base stations 220 in the MBSFN. In this instance, the MBSFN splits into two new MBSFNs, each including a respective one of the sets the UE devices 210 and the small cell base stations that they are using. When the reporting server 265 determines that two or more groups of adjacent UE device, being served by separate MBSFNs, are accessing essentially the same content items, it recommends joining the two MBSFNs.

The changes, however, are made by the BVPS 253 and BMSC node 255. As described above, the reporting server 265 receives and collects the reports and/or the survey responses provided by the UE devices assigned to the various MBSFNs (block 710). Next, the reporting server ranks the content in each list that is currently being accessed and the content that the users have indicated that they want to access and recommends removal of any content that is not being watched (block 720). In one implementation, the content may be ranked by the number of users who are accessing it or who have indicated a desire to access it. The content items may be ranked by recording each content item in a list and associating the item with a number of UE devices in the MBSFN that are accessing it or that would like to access it. The list may then be sorted based on this number to produce the ranked list. Content items associated with larger numbers are ranked higher than those with lower numbers.

In another implementation, the survey responses are used to rank the content items. For example, a survey may ask a user to rate each content item as good, neutral or bad. A first content item receiving bad rating in a threshold number of survey responses may have its ranking reduced by one step while a second content item receiving a good rating from the threshold number of responses may have its ranking increased by one step. It is contemplated that other techniques may be used to modify the rankings based on the survey results.

Additionally, the requests for programs in the EPG may factor into the rankings. For example, if the system is being used in a stadium to augment a game, the scoreboard in the stadium may display the score of a game being played by a rival team. This display may cause the people attending the game to request access to the television feed of the rival team's game in one or more of the MBSFNs. If this game is listed in the EPG for the MBSFN, the reporting server 265 may receive an increase in requests to view the game. These requests may be used to place the television feed of the other game higher in the ranking for that MBSFN even though it is not currently being broadcast.

At block 730, localized content is identified. These are content items that are accessed by UE devices 210 in one MBSFN, or through one small cell base station 220 or through a group of adjacent small cells base stations. Block 740 analyzes the localized content as well as all of the other content being broadcast by the MBSFNs to determine if any existing MBSFN should be split into two new MBSFNs or if two existing MBSFNs should be joined into a single MBSFN. Details of these aspects of block 740, as performed by the BVPS 253 and BMSC node 255, are described below with reference to FIGS. 8 and 9. Once the assignment of content items to MBSFNs has been decided, block 740 also analyzes the number of UE devices accessing or requesting access to each content item being broadcast by each MBSFN to determine whether the content item should be switched from broadcast to unicast or from unicast to broadcast. In one implementation, for each MBSFN, if the number of UE devices accessing or requesting access to a broadcast content item is less than a first threshold (e.g. 3), block 730 recommends switching the content item from broadcast to unicast. If, however, the number of UE devices in the MBSFN that are accessing or requesting access to a unicast content item is greater than second threshold (e.g. 4), block 730 recommends switching the content item from unicast to broadcast. The values of the thresholds may be determined empirically (e.g., 10-20% UE requests for the first threshold and 20-30% for the second threshold), as may the relative value between the two thresholds (e.g., 10% overall UE requests or 25% difference between thresholds).

At block 750, EPGs for any new MBSFNs are generated and the EPGs for the existing MBSFNs are modified to reflect the new content items. If additional unicast or broadcast bandwidth is available, the reporting server determines whether new content should be added to the EPGs. For example, if different camera feeds from the game in progress are ranked high on the list of one MBSFN, the EPG server 247 may offer more camera feeds in the EPG for that MBSFN. Also if, during halftime, non-game-related content is ranked higher, the EPG server 247 may add more entertainment content to the EPGs for all of the MBSFNs. This content may replace game related content, for example camera feeds that are not needed during halftime.

If the reporting server determines that new content should be added for an MBSFN, it may notify the EPG server 247 to add new content to the EPG of that MBSFN. In one implementation, the reporting server 265 may send the ranked lists with any recommended MBSFN modifications as well as unicast to broadcast switching recommendations to the BVPS 253 and content source 245 which may then interface with the EPG server 247 to change the EPG content for each MBSFN. In another implementation, the reporting server 265 may pass the ranked lists to the EPG server 247 so that the EPG server can communicate with the BVPS 253 and content source 245 to determine which content should be added to the EPG for each MBSFN.

Alternatively or in addition, the EPG server 247 may add or delete content items from the EPG based on the types of EPG requests that are being received. If for example, there is an increase in requests for non-game-related content for a particular MBSFN, the EPG server 247 may include additional non-game-related content in the EPG that is broadcast to all of the UE devices 210 in the MBSFN. If a content item is not being accessed by any of the UE devices in the MBSFN, it may be eliminated from the EPG, either immediately or after a suitable delay. For example, a content item may be retained in the EPG for 10-20 minutes to ensure that the lack of requests for the content is not a temporary event. The delay may be determined empirically by initially leaving non-accessed content items in the EPG and collecting data on the amount of time that there are no requests for the items. This data may be analyzed as a frequency distribution having a mean and a standard deviation. Once a sufficient amount of data has been collected, for example 50 non-accessed items, the EPG server 247 may set the delay time, for example to one or two standard deviations of the frequency distribution. The frequency distribution data may be recalculated if the EPG server determines that non-accessed items are not being re-accessed during the delay period but are being re-accessed after the delay period.

In determining whether additional unicast bandwidth is available for an MBSFN, the BVPS 253 and BMSC node 255 may be constrained by the volume of mobile telephone calls being handled by the small cell base stations 220 associated with the MBSFN. In one implementation, only 60 percent of the bandwidth of the small cell base stations 220 that is not being used for mobile telephone calls may be used for broadcast transmissions. This bandwidth may change dynamically and is monitored, for each MBSFN, by the BVPS and BMSC node 255.

As described above, network conditions may be monitored at block 620 (shown in FIG. 6). Network condition information may be collected by one or more network devices, such as one or more small cell base stations 210, SGW 230, MME 235, PGW 240 and/or one or more other types of network devices, and transmitted to reporting server 265, BVPS 253 or BMSC node 255 for processing. As mentioned above, the network conditions monitored may correspond to one or more of a variety of circumstances relating to the network. For instance, reporting server 265 may monitor a load condition of the network (e.g., a level of network activity, a level of network congestion, etc.), a period of time corresponding to the network (e.g., a period of time corresponding to peak network usage hours, a period of time corresponding to off-peak network usage hours, etc.), a location of UE device 210 in the service venue area, or another type of condition relating to the network and/or UE device 210.

Network conditions may also factor into the determination of whether to split or join MBSFNs and/or whether provide content using unicast or broadcast services (block 740). For example, reporting server 265 may consider the network conditions and make a recommendation to provide content to UE devices 210 via unicast transmission services or broadcast transmission services. As described above, reporting server 265 may determine which type of transmission service to use (e.g., unicast services or broadcast services) based on the network conditions monitored and pass recommendations on the services to the BVPS 253 and content source 245.

For example, reporting server 265 may consider a level of network congestion corresponding to one or more MBSFNs and/or network devices servicing the MBSFNs. Doing so may enable reporting server 265 to determine whether two MBSFNs should be combined to reduce the load on a particular network device or whether delivery of particular content in one or more of the MBSFNs would be better if a unicast transmission service and/or a broadcast transmission service were used. Similarly, reporting server 265 may consider a geographic location corresponding to one or more UE devices 210 requesting the content. As described above, if content demand is localized within the service area, splitting the MBSFN providing that content into two MBSFNs may result in a more efficient use of the total bandwidth. Doing so may enable reporting server 265 to identify the network resources (e.g., the radio frequency bandwidths, the types of transmission services, processing capacity, etc.) that could be used by the various MBSFNs to respond to the requesting UE device 210.

When the reporting server 265 recommends switching content from broadcast to unicast, the BVPS 253 may stop transmitting the item while the content source 254 routes the unicast transmission through the PGW 240 and SGW 230. The BVPS 253 may signal the content source 254 when it is dropping broadcast transmissions of the item so that the content source knows when to establish the unicast transmission(s).

Figure 8:
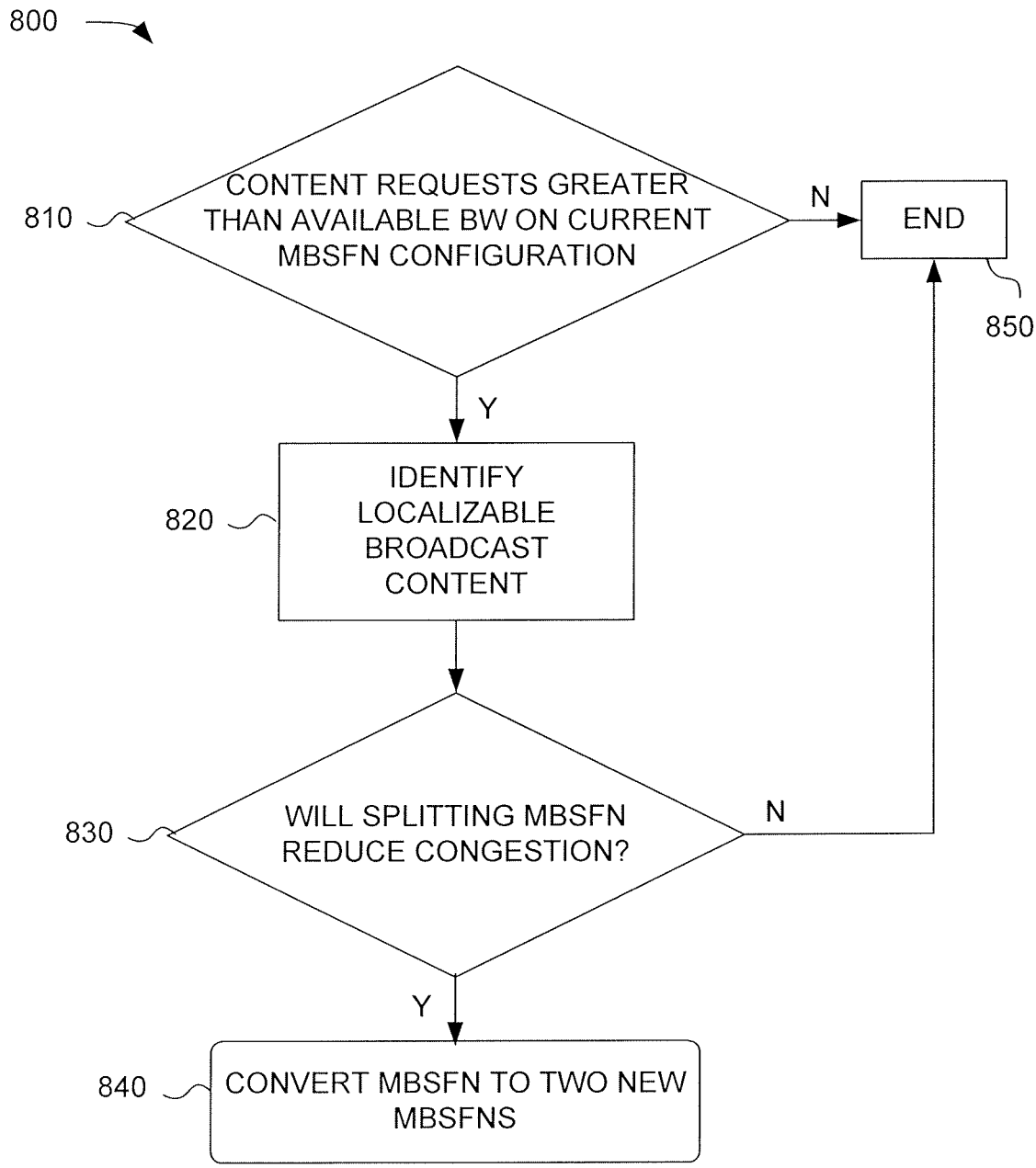
FIGS. 8 and 9 are flow-chart diagrams of example processes executed by the BVPS and the broadcast multicast service control (BMSC) node in response to data provided by the reporting server.

FIG. 8 is a flow-chart that illustrates the steps of an example process 800 performed by the BVPS 253 on receiving the ranked lists and/or the recommendations from the reporting server 265. If the accessed and requested content on the list for an MBSFN is not greater than the available bandwidth of the MBSFN as it is currently configured (block 810), the process terminates at step 850. Otherwise, if the accessed and requested content is greater than the available bandwidth the MBSFN, then the process attempts to identify localizable broadcast content. This is a content item that is provided to one UE device 210 or to one small cell base station 220 in the MBSFN but not provided to another UE device 210 or small cell base station 220. In this instance, the MBSFN may be split into two daughter MBSFNs and the content item is broadcast only by the daughter MBSFN that services the identified UE device 210 and small cell base station 220. Block 830 determines if localizable content has been identified and, if it has, whether splitting the MBSFN will reduce congestion. If splitting will not reduce congestion, then the process terminates at step 850. If, however, block 830 determines that splitting will reduce the bandwidth requirements so that more content may be delivered to more users, then the MBSFN is converted to two MBSFNs at block 840.

When one MBSFN is split into two MBSFNs, the BMSC node 255 reconfigures the small cell base stations 220 and changes the network addresses for at least some of the UE devices to receive data from the new MBSFN. If two new MBSFNs are formed, the network addresses of all of the UE devices 210 will be changed.

If the reporting server 265 has recommended switching content that is currently being unicast to be broadcast by the MBSFN, the BVPS 253 and BMSC node 255 determine if sufficient broadcast bandwidth is available and, if it is, start broadcasting the content and terminate the unicast transmissions. To implement this switch, the BMSC node 255 may cause the MBMS-GW 250 and small cell base station 220 to begin transmitting the content in a broadcast channel of the MBSFN and signal the content source 245 to cause the PGW 240, SGW 230 and small cell base station 220 that is handling the unicast transmission to terminate unicasting of the particular content.

Similarly, if the reporting server 265 has recommended switching content that is currently being broadcast by the MBSFN to be unicast, the BVPS 253 and BMSC node 255 cause the MBSFN to stop transmitting the selected content. To implement this switch, the reporting server 265 notifies the content source 245 to cause the PGW 240, SGW 230 and one of the small cell base stations 220 to begin transmitting the content in a unicast channel and the BVPS 253 causes the MBMS GW 250 and small cell base station 220 to terminate the broadcast transmission through the MBSFN.

If the reporting server indicates that new content should be added to the EPG for the MBSFN, the process determines if sufficient broadcast bandwidth is available to accommodate the new content. If it is, the BVPS 253 notifies the EPG server to add the recommended content for the MBSFN. If, after adding the recommended content to the EPG, the process determines that additional broadcast bandwidth is available, the BVPS determines event-related or non-event-related content to add to the EPG for the MBSFN. If no additional bandwidth is available, the process terminates.

Figure 9:
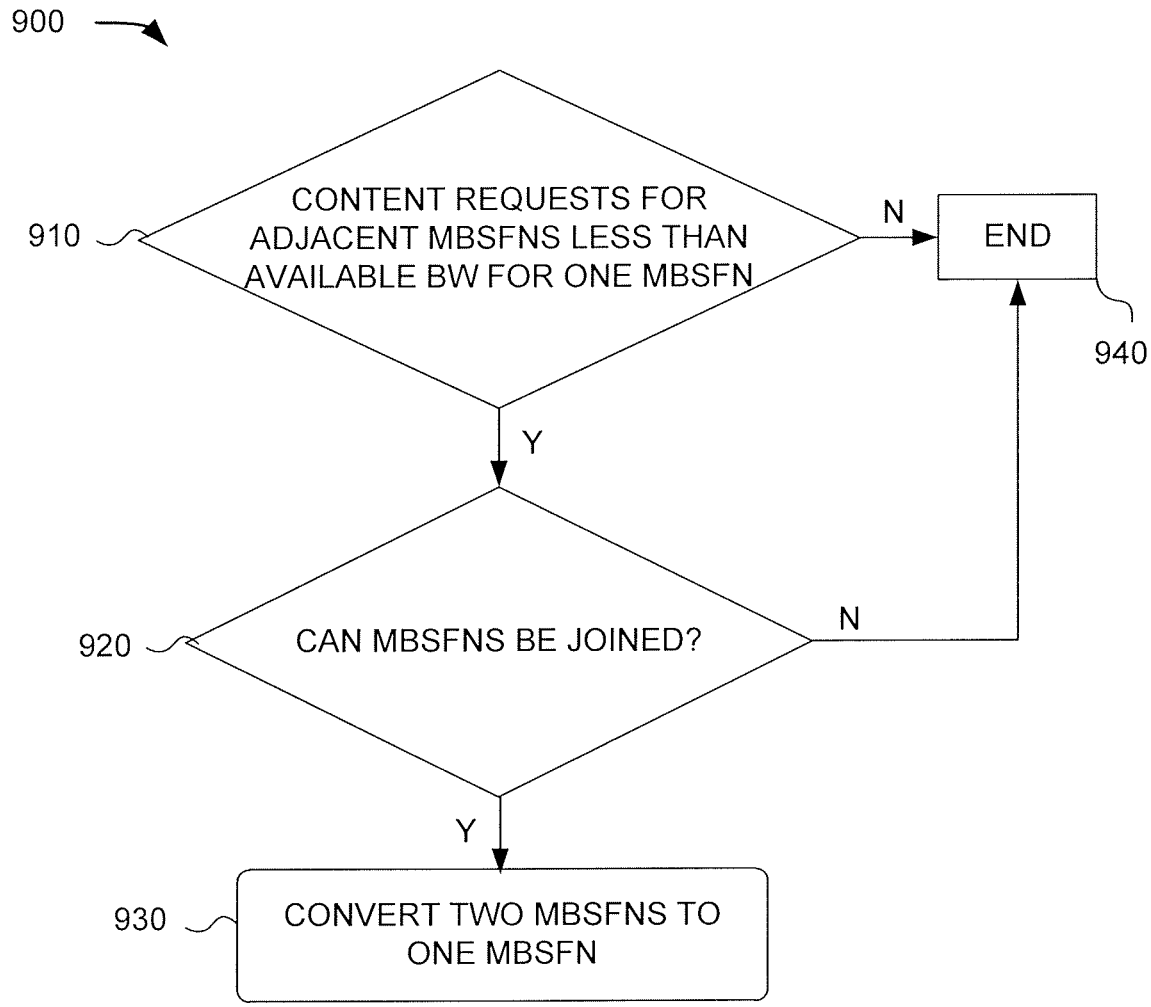

FIG. 9 is a flow-chart diagram of a process 900 executed by the BVPS 253 when the reporting server 265 recommends joining two MBSFNs to form one MBSFN. The bandwidth required by content items being broadcast or requested by the two MBSFNs is evaluated (block 910). If that required bandwidth is greater than the available bandwidth of a single MBSFN, then the two MBSFNs cannot be joined and the process terminates (block 940). If, however, the combined bandwidth is not greater than the bandwidth of one of the MBSFNs, then the process, at block 920, determines if the two MBSFNs can be joined. If they cannot, for example because they are being controlled by different BMSC nodes 255, then the process terminates at block 940. Otherwise, the MBSFNs are joined at block 930. The joining of the MBSFNs also joins their EPGs so step 930 notifies the EPG server 247 to combine the content of the EPGs of the two MBSFNs.

When two MBSFNs are joined, the small cell base stations 220 and UE devices are reprogrammed for the new network parameters.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a reporting server and via a first multicast/broadcast single frequency network (MBSFN), respective reports on content items being accessed by a plurality of user equipment (UE) devices through the first MBSFN;
   determining, by the reporting server, for each content item being accessed, whether each of the plurality of UE devices is accessing the content item;
   grouping, by the reporting server, the plurality of UE devices based on the accessed content items such that at least one content item is accessed by a first group of UE devices and not accessed by a second group of UE devices; and
   sending, by the reporting server, data representing the first and second groups to a broadcast video provisioning system (BVPS);
   receiving, by the BVPS, the data representing the first and second groups of UE devices;
   determining, by the BVPS, an amount of available broadcast bandwidth of the first MBSFN and bandwidth requirements of all of the content items accessed by the first and second groups of UE devices; and
   analyzing, by the BVPS, to determine whether changes to configuration of the MBSFN or the broadcasting of the content items is required.

2. The method of claim 1, further comprising:
   sending, by the reporting server and to each UE device being serviced by the first MBSFN, a request for the respective report prior to receiving the respective report.

3. The method of claim 2, wherein the sending of the request includes sending separate unicast requests to each of the UE devices being serviced by the first MBSFN.

4. The method of claim 2, wherein the sending of the request includes causing the first MBSFN to broadcast the request to all of the plurality of UE devices.

5. The method of claim 1, further comprising:
   when the bandwidth requirements of the content items accessed by the first and second groups is greater than the available bandwidth of the first MBSFN, splitting the first MBSFN to form a second MBSFN servicing the first group of UE devices and a third MBSFN servicing the second group of UE devices.

6. The method of claim 5, further comprising:
   for each of the first and second groups of UE devices, determining by the reporting server, for each content item a number of UE devices in the group that are accessing the content item;
   ranking, by the reporting server, the content items for each of the first and second groups by the number of UE devices that are accessing the content items to form a ranked list; and
   generating, by the reporting server, a recommendation to the BVPS to switch selected ones of the content items currently being broadcast to be unicast based on the ranking of the selected content items in the ranked list.

7. The method of claim 6, further comprising:
   receiving, by the reporting server and via the network, respective survey responses from the UE devices in the first and second groups, the survey responses including ratings of the content items being accessed by the UE devices in the first and second groups;
   wherein the ranking of the content items includes reducing the ranking of content items having poor ratings and increasing the ranking of multimedia content items having good ratings.

8. The method of claim 6, further comprising:
   sending, by the reporting server, the ranked lists for the first and second groups of UE devices to an electronic program guide (EPG) server whereby the EPG server generates respective first and second EPGs for the respective second and third MBSFNs.

9. The method of claim 1, further comprising:
   receiving, by the reporting server and via fourth and fifth MBSFNs, respective reports on content items being accessed by a plurality of further UE devices through the fourth and fifth MBSFNs;
   determining, by the reporting server, a total bandwidth requirement of all of the content items being accessed by the plurality of further UE devices through the fourth and fifth MBSFNs; and
   if the total bandwidth requirement is not greater than a broadcast bandwidth of one of the fourth or fifth MBSFNs, sending data representing the content items being accessed by the plurality of further UE devices through the fourth and fifth MBSFNs to the BVPS with a recommendation to join the fourth and fifth MBSFNs to form a sixth MBSFN.

10. The method of claim 9, further comprising:
   receiving by the BVPS the data representing the content items being accessed by the plurality of further UE devices through the fourth and fifth MBSFNs and the recommendation to join the fourth and fifth MBSFNs;
   determining, by the BVPS, an amount of broadcast bandwidth of the fourth and fifth MBSFNs and the bandwidth requirements of all of the content items accessed by the further UE devices through the fourth and fifth MBSFNs; and when the bandwidth requirements of the content items accessed by the further UE devices is not greater than the broadcast bandwidth of at least one of the fourth or fifth MBSFNs, joining the fourth and fifth MBSFNs to form the sixth MBSFN and assigning the further UE devices to the sixth MBSFN.

11. A system comprising:

a reporting server coupled to a first multicast/broadcast single frequency network (MBSFN), the reporting server including a processor and a communications interface, the processor of the reporting server being configured:

to receive, via the communications interface of the reporting server, respective reports on content items being accessed by a plurality of user equipment (UE) devices through the first MBSFN;

to determine, for each content item whether each of the plurality of UE devices is accessing the content item;

to group the plurality of UE devices into first and second groups based on the content items being accessed by the UE devices such that at least one content item is accessed by the first group of UE devices and is not accessed by the second group of UE devices; and to send data identifying the first and second groups of UE devices to a broadcast video provisioning system (BVPS) server coupled to the first MBSFN; and the BVPS server including a processor and a communications interface, the processor of the BVPS server being configured:

to receive the data identifying the first and second groups;

to determine an amount of available broadcast bandwidth of the first MBSFN and bandwidth requirements of all of the content items accessed by the first and second groups of UE devices; and to split the first MBSFN to form a second MBSFN to service the first group of UE devices and a third MBSFN to service the second group of UE devices, when the bandwidth requirement of the content items accessed by the first and second groups of UE devices is greater than the available bandwidth of the first MBSFN.

12. The system of claim 11, wherein the processor of the BVPS is further configured to:

receive the data representing the first and second groups and the recommendation to split the first MBSFN into the second and third MBSFNs;

determine an amount of available broadcast bandwidth of the first MBSFN and bandwidth requirements of all of the content items accessed by the first and second groups of UE devices; and to split the first MBSFN to form the second MBSFN servicing the first group of UE devices and the third MBSFN servicing the second group of UE devices, when the bandwidth requirements of the content items accessed by the first and second groups is greater than the available bandwidth of the first MBSFN.

13. The system of claim 11, wherein the processor of the reporting server is further configured to:

determine, for each of the first and second groups of UE devices and for each content item, a number of UE devices in the group that are accessing the content item;

rank the content items for each of the first and second groups by the number of UE devices that are accessing the content items to form a ranked list; and generate a recommendation to the BVPS to switch selected ones of the multimedia content items currently being broadcast to be unicast based on the ranking of the selected content items in the ranked list.

14. The system of claim 13, wherein the processor of the reporting server is further configured to:

receive, via the network interface of the reporting server, respective survey responses from the UE devices in the first and second groups, the survey responses including ratings of the content items being accessed by the UE devices in the first and second groups;

wherein the ranking of the content items includes reducing the ranking of content items having poor ratings and increasing the ranking of multimedia content items having good ratings.

15. The system of claim 13 further comprising:

an electronic program guide (EPG) server including a processor and a network interface;

wherein the processor of the reporting server is configured to:

send, via the network interface of the reporting server, the ranked lists for the first and second groups of UE devices to the EPG server; and wherein the processor of the EPG server is configured to receive the ranked lists for the first and second groups via the network interface of the EPG server and to generate respective first and second EPGs for the respective second and third MBSFNs.

16. The system of claim 11, wherein:

the processor of the reporting server is further configured to:

receive, via fourth and fifth MBSFNs, respective reports on content items being accessed by a plurality of further UE devices through the fourth and fifth MBSFNs;

determine, by the reporting server, a total bandwidth requirement of all of the content items being accessed by the plurality of further UE devices through the fourth and fifth MBSFNs; and if the total bandwidth requirement is not greater than a broadcast bandwidth of one of the fourth or fifth MBSFNs, send data representing the content items being accessed by the plurality of further UE devices through the fourth and fifth MBSFNs to the BVPS; and the processor of the BVPS is further configured to:

receive, via the communications interface of the BVPS, the data representing the content items being accessed by the further UE devices through the fourth and fifth MBSFNs; and join the fourth and fifth MBSFNs to form a sixth MBSFN.

17. A non-transitory computer readable medium including programming instructions configured to cause at least one processor to:

receive respective reports on content items being accessed by a plurality user equipment (UE) devices through a first multicast/broadcast single frequency network (MBSFN);

determine for each content item being accessed, whether each of the plurality of UE devices is accessing the content item;

group the UE devices by the accessed content items such that at least one content item is accessed by a first group of UE devices and not accessed by a second group of UE devices;

send data representing the first and second groups to a broadcast video provisioning system (BVPS) coupled to the first MBSF;

determine an amount of available broadcast bandwidth of the first MBSFN and bandwidth requirements of all of the content items accessed by the first and second groups of UE devices; and determine whether changes to configuration of the first MBSFN or the broadcasting of the content items is required.

18. The non-transitory computer readable medium of claim 17 comprising further programming instructions configured to cause the at least one processor to:

when the bandwidth requirements of the content items accessed by the first and second groups is greater than the available bandwidth of the first MBSFN, split the first MBSFN to form a second MBSFN servicing the first group of UE devices and a third MBSFN servicing the second group of UE devices.

19. The non-transitory computer readable medium of claim 18, wherein the programming instructions are further configured to cause the at least one processor to:

for each of the first and second groups of UE devices, determine for each content item a number of UE devices in the group that are accessing the content item;

rank the content items for each of the first and second groups by the number of UE devices that are accessing the content items to form a ranked list; and generate a recommendation to the BVPS to switch selected ones of the multimedia content items currently being broadcast to be unicast based on the ranking of the selected content items in the ranked list.

20. The non-transitory computer readable medium of claim 19, wherein the programming instructions are further configured to cause the at least one processor to:

receive respective survey responses from the UE devices in the first and second groups, the survey responses including ratings of the content items being accessed by the UE devices in the first and second groups;

wherein the ranking of the content items includes reducing the ranking of content items having poor ratings and increasing the ranking of multimedia content items having good ratings.

\* \* \* \* \*